US010817885B2

(12) United States Patent
Concannon et al.

(10) Patent No.: US 10,817,885 B2
(45) Date of Patent: Oct. 27, 2020

(54) DYNAMICALLY ADJUSTED AUTOMATED ITEM REPLENISHMENT

(71) Applicant: Quidsi, Inc., Jersey City, NJ (US)

(72) Inventors: Michael John Concannon, Westfield, NJ (US); Ivan Georgiyevich Arkhipov, Seattle, WA (US); Seyed Sina Chavoshi, Bellevue, WA (US)

(73) Assignee: Quidsi, Inc., Jersey City, NJ (US)

( * ) Notice: Subject to any disclaimer, the term of this patent is extended or adjusted under 35 U.S.C. 154(b) by 841 days.

(21) Appl. No.: 14/662,072

(22) Filed: Mar. 18, 2015

(65) Prior Publication Data

US 2016/0275530 A1    Sep. 22, 2016

(51) Int. Cl.
*G06Q 30/00* (2012.01)
*G06Q 30/02* (2012.01)
(Continued)

(52) U.S. Cl.
CPC ....... *G06Q 30/0202* (2013.01); *G06Q 10/087* (2013.01); *G06Q 30/0601* (2013.01); *G06Q 10/06315* (2013.01); *G06Q 10/103* (2013.01); *G06Q 10/105* (2013.01); *G06Q 30/00* (2013.01); *G06Q 30/02* (2013.01);
(Continued)

(58) Field of Classification Search
CPC .......... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 7/20; G06Q 30/06; H04Q 7/20
See application file for complete search history.

(56) References Cited

U.S. PATENT DOCUMENTS 7,130,814 B1 * 10/2006 Szabo ................ G06Q 30/0201
 705/26.8
7,353,194 B1    4/2008 Kerker et al.
(Continued)

FOREIGN PATENT DOCUMENTS

JP    2001325523    11/2001
JP    2002117295    4/2002
(Continued)

OTHER PUBLICATIONS

Tsiros et al., The Effect of Expiration Dates and Perceived Risk on Purchasing Behavior in Grocery Store Perishable Categories, Journal of Marketing, vol. 69 (Apr. 2005), 114-129 (Year: 2005).*
(Continued)

*Primary Examiner* — Patricia H Munson
*Assistant Examiner* — Uche Byrd
(74) *Attorney, Agent, or Firm* — Kilpatrick Townsend & Stockton LLP

(57) ABSTRACT

A mechanism is described for determining an amount of item that remains in the possession of a consumer for an automatic item subscription system, as well as a subsequent replacement date for that item. The remaining item amount may be determined from a consumption rate that is calculated from a number of factors. In some embodiments, the consumption rate may be based on cluster data or data representing trends related to the underlying item. As the consumption rate for an item changes, the replacement date may be dynamically updated to reflect the change in the consumption rate.

19 Claims, 10 Drawing Sheets

(51) Int. Cl.
*G06Q 10/08* (2012.01)
*G06Q 30/06* (2012.01)
*G06Q 10/10* (2012.01)
*G06Q 10/06* (2012.01)
*G06Q 40/00* (2012.01)

(52) U.S. Cl.
CPC ......... *G06Q 30/0255* (2013.01); *G06Q 30/06* (2013.01); *G06Q 40/00* (2013.01)

(56) References Cited

U.S. PATENT DOCUMENTS

| | | | |
|---|---|---|---|
| 8,126,784 B1 * | 2/2012 | Agarwal | G06Q 10/00 705/22 |
| 8,150,771 B1 | 4/2012 | Baram | |
| 8,626,562 B2 | 1/2014 | Milman et al. | |
| 8,666,847 B1 | 3/2014 | Blank et al. | |
| 8,924,262 B2 | 12/2014 | Shuster | |
| 9,109,943 B2 * | 8/2015 | Mager | G01G 23/3735 |
| 9,519,867 B1 | 12/2016 | Reeves et al. | |
| 9,659,310 B1 | 5/2017 | Allen et al. | |
| 2006/0173749 A1 * | 8/2006 | Ward | G06Q 10/08 705/26.8 |
| 2006/0247985 A1 | 11/2006 | Liamos et al. | |
| 2008/0201374 A1 * | 8/2008 | Oya | G06Q 10/087 |
| 2013/0218511 A1 | 8/2013 | Mager et al. | |
| 2015/0088570 A1 * | 3/2015 | Yenni | G06Q 10/06 705/7.15 |
| 2017/0249602 A1 | 8/2017 | Robertson et al. | |
| 2017/0286977 A1 * | 10/2017 | Allen | G06Q 30/0254 |

FOREIGN PATENT DOCUMENTS

| | | |
|---|---|---|
| JP | 2003281006 | 10/2003 |
| JP | 2004094585 | 3/2004 |
| JP | 2005063215 | 3/2005 |
| JP | 2012014466 | 1/2012 |

OTHER PUBLICATIONS

U.S. Appl. No. 14/622,082, filed Mar. 18, 2015, Titled: Dynamically Adjustable Subscription Renewal Rate—Produce Consumption Input.
PCT/US2016/023283, "International Search Report and Written Opinion", dated Aug. 1, 2016, 11 pages.

* cited by examiner

DYNAMICALLY ADJUSTED AUTOMATED ITEM REPLENISHMENT

BACKGROUND

As people become more sophisticated users of online services, they are presented with increased functionalities, and are demanding increased convenience and automation. To accommodate this demand, some providers allow users to set up monthly subscriptions for products and services they consume. However, these systems are often difficult to adapt to individual preferences as each uses the subscribed products at different rates. This, in turn, causes inconvenience for some users.

BRIEF DESCRIPTION OF THE DRAWINGS

Various embodiments in accordance with the present disclosure will be described with reference to the drawings, in which.

DETAILED DESCRIPTION

Figure 1:
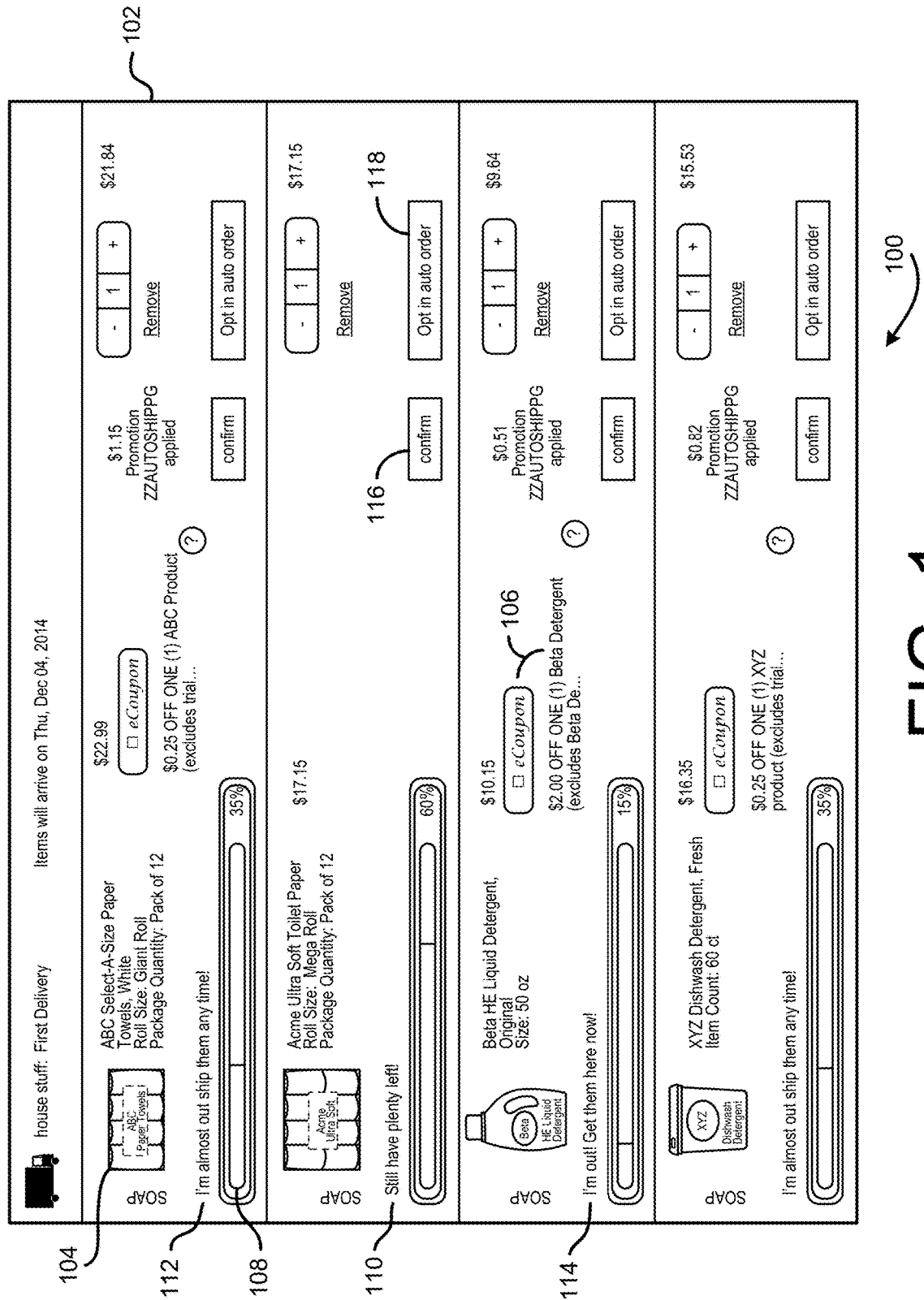
FIG. 1 depicts an illustrative item subscription system in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a processor device configured to dynamically assess and update consumption rates for consumers in an item subscription system that may be used to automatically order items with more optimal timing. Specifically, the disclosure is directed to determining a consumption rate that applies to a particular item for a particular consumer within an item subscription system. This consumption rate may be determined from clustering data gathered by a subscription system as well as general trends affecting the underlying consumption rate of the item.

In accordance with at least one embodiment, an item (which could be any product, good, or service, or category of products) may experience higher use during specific times of the year or under certain conditions. For example, the consumption rate of lip balm is typically higher in cold months as more consumers tend to get chapped lips during those months. Additionally, a consumption rate for an item may be affected by a change in the economy, a fad (a temporary increase in popularity for an item), seasonality, an event (such as a snowstorm, sporting event, or earthquake), or any other external market force (factors affecting the consumption of an item that are unrelated to the item itself). These sorts of external market forces may be considered when creating an underlying consumption rate for an item. In general, an underlying consumption rate for an item may be determined from the average use and/or purchases of the item by a broad consumer base. Economic factors may also play a role in determining a consumption rate. For example, some items may be considered inferior goods (good that are consumed more frequently under poor economic conditions) and some items may be considered superior goods (goods that are consumed more frequently under positive economic conditions). Economic trends may affect the consumption rate of those items. Additionally, some consumers that are considered similar enough to be grouped together may share a consumption rate that is common to their group (a common consumption rate). In accordance with at least one embodiment, people may be clustered into like groups to determine a common consumption rate for a group of people. Furthermore, a person may have a particular consumption rate for the item that is outside of the common consumption rate. Furthermore, consumption rates may vary between particular brands, versions, or types of an item.

In some embodiments, a consumer's personal consumption rate for an item may be combined with the underlying item consumption rate and/or a common group consumption rate to create an overall or a more accurate consumption model for that consumer. This consumption model may then be used to more accurately predict when an item will run out for a consumer so that a subscription system may automatically reorder those items on behalf of that consumer. The consumer may also be given a means to indicate that the consumption rate is too high or too low, which may also be utilized by the subscription system to adjust consumption rates and create a more accurate consumption model.

FIG. 1 depicts an illustrative item subscription system 100 as described herein in accordance with at least one embodiment. In FIG. 1, an example user interface 102 is depicted. A user interface may be implemented in a web page displayed in a web browser application, a graphical user interface (GUI) of an application on a user device, or any other suitable means of providing information to a user and/or enabling the user to interact with the subscription system 100. An item subscription system is any system configured to ship one or more items to a consumer automatically at a determined time or on a periodic or semi-periodic basis. In an item subscription system, a consumer (or user) may subscribe to an item by electing to have the item automatically ordered on a periodic basis. In accordance with at least some embodiments, a user may be required to log into an account in order to access the user interface 104 for the subscription system 100 depicted.

In accordance with at least one example, the user interface 102 may include a listing or depiction of at least one item 104 available from an electronic marketplace. The user interface 102 may present a variety of data points or item related information, such as an item price, item availability, an image of the item, a rating for the item, or any other suitable item-related information. In accordance with at least one embodiment, the user interface 104 may display currently available savings offers 106 such as e-coupons or sale prices.

Figure 3:
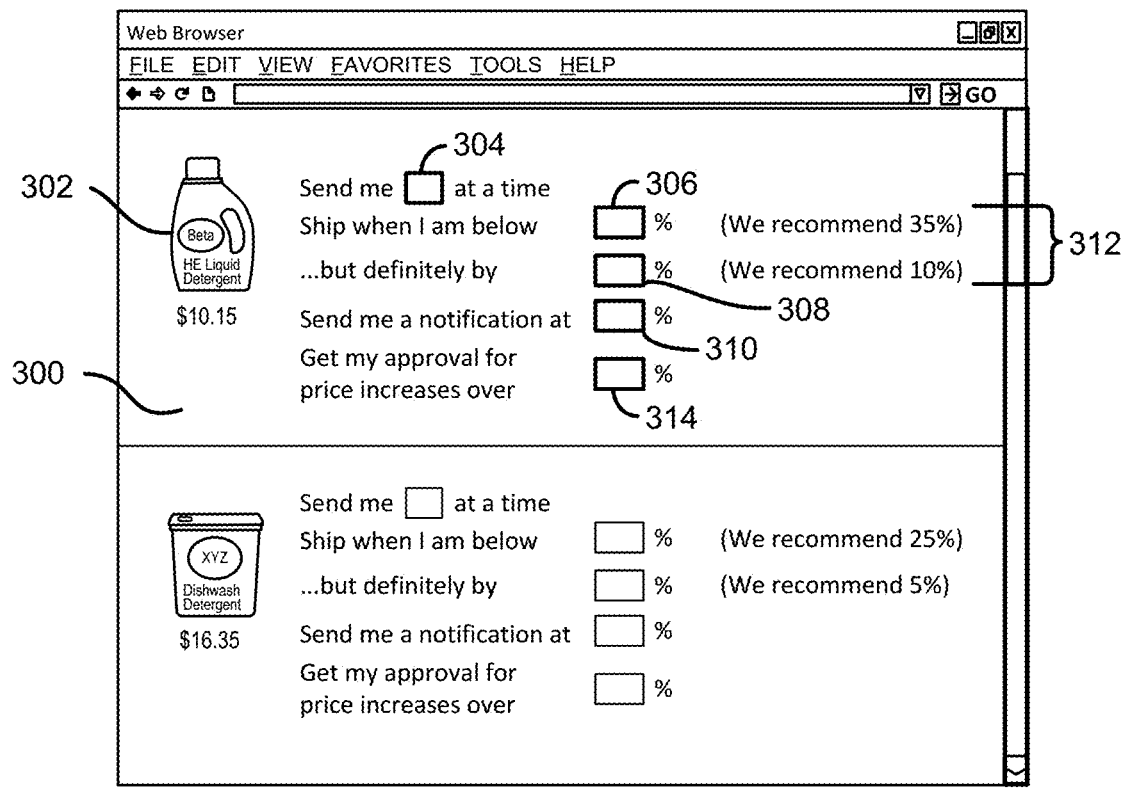
FIG. 3 depicts an illustrative user setup display for an item subscription system in accordance with at least one embodiment.

In accordance with at least some embodiments of subscription system 100, the item 104 may be given a renewal rate that represents the rate at which the item 104 should be replaced. In some embodiments, the user interface 102 may present a renewal date, which may be any date upon which a replacement of the item 104 is scheduled to be shipped. The renewal rate may be dependent on a consumption rate and may be dynamically updated upon determining that the consumption rate has changed. A consumption rate is the rate at which an item is being consumed, and may be actual or predicted. In some embodiments, a consumption rate may be expressed as an amount of product used per period of item (i.e., 0.5 per week or 2.8 per month). In at least some embodiments, the renewal rate may have an inverse relationship with the consumption rate. For example, if a consumption rate is 2.0 items consumed per time period, then the renewal rate may be ½ or 0.5 time periods (which would indicate that the item needs to be replaced every one half of the time period). In addition, a renewal rate may be capped by an expiration date for the item, as in a renewal date may be the sooner of the expiration date or the date that a consumption rate indicates the product will be gone. For example, if the user has opted to receive an automatic subscription for milk, a replacement may be sent by the expiration date of the previous milk that was purchased whether or not it has been fully consumed. In accordance with at least one embodiment, the user may be presented with a item remaining indicator 108 that depicts the amount of the item that the subscription system has estimated that a user has left based on the consumption rate of the item. As depicted in FIG. 3, the item remaining indicator 108 may be exemplified by a progress bar, but in at least some other embodiments, the item remaining indicator may be a percentage, an expected renewal date, or any other suitable means of indicating to the user a rate of consumption for the item. In addition to depicting an amount of an item that is left, the item remaining indicator 108 may depict an approximation of the amount of useful life left for an item or the amount of battery life left for the item. For example, a durable good may have an average useful life of five years (i.e., the durable good typically needs replacement every five years). However, a particular user may not use the durable good as much as the average user and so his or her consumption rate for that durable good may be lower. In this example, the item remaining indicator 108 would decrease more slowly than it would for the average user and the renewal rate for that user would be lower in that renewals will occur at intervals of greater than five years. In some embodiments, the item remaining indicator may be color coded based on upcoming renewal dates. For example, if the user only has a small amount of the product left, the progress bar may be red in order to draw attention to the item that may need replacement. In accordance with at least one embodiment, the item remaining indicator 108 may be updated by the user. For example, where the item remaining indicator 108 is a progress bar, the user may be given the ability to click on or otherwise select a location within the progress bar to indicate the actual amount of the product that is left. In accordance with at least one embodiment, the item remaining indicator 108 may indicate that the amount of item left is over 100%. For example, the user may receive a replacement item before the current item has been completely used up and may be in possession of more than a whole item. In at least some embodiments, the amount of item left may be a combined total of two or more items, especially where the two items are interchangeable with each other, or one can serve as a substitute for the other. For example, if the user has subscribed to Brand X toothpaste, but later purchases a tube of Brand Y toothpaste, the amount of toothpaste left may be tracked and assigned to whichever brand toothpaste the user is currently subscribed to. For example, since the two brands are both toothpaste, the amount of toothpaste considered to be remaining for the subscription Brand X can take into account the recently purchased Brand Y toothpaste, thus extending the time before a replacement tube of Brand X toothpaste is scheduled for delivery. In at least some embodiments, the subscription system may offer to switch the user's subscription from Brand X to Brand Y when the user is subscribed to Brand X but purchases a similar item in Brand Y.

In some embodiments, the user may be able to suspend consumption of the item. For example, if the user is away from home and not consuming the item, the user may be given the ability to set the consumption rate to zero (or a significantly lower rate) over the time that the user will be away. In some of these embodiments, the user may set a consumption rate to zero for particular items. For example, the user may elect to take certain items with him or her, which would continue to be consumed. In this example, the consumer may set the consumption rate to zero for only the items which are not taken along. Furthermore, the user may also be given the ability to forward items to an alternative address or addresses. For example, if the consumer leaves on a trip and takes along particular items, the consumer may elect to have the replacement for those items sent to him or her on the trip. For example, if the consumer has subscribed to baby formula, the consumer may wish to have the replacement formula sent to a hotel or temporary lodging at which the user is staying. In at least some embodiments, the user may provide a list of addresses and dates at which the user will be at those addresses. In at least some of these embodiments, the subscription system may send the subscribed item to the user at the address at which the user will be when the item arrives.

In accordance with at least some embodiments of subscription system 100, a shipping status indicator 110, 112, or 114 may be presented in addition to the item remaining indicator 108. A shipping status indicator may provide a user with potential shipping information related to the particular item and may be based on the amount of the item that is left as according to the item remaining indicator 108. In accordance with at least one embodiment, the shipping status indicator 110 may indicate that the item is not currently to be shipped to the user because the amount left is over a first threshold (a shipping threshold) according to the item remaining indicator 108. In accordance with at least one embodiment, the shipping status indicator 112 may indicate that the item is to be shipped to the user at any time once the item remaining indicator 108 indicates that the amount of item left is below a shipping threshold level. In accordance with at least one embodiment, the shipping status indicator 114 may indicate that the item is to be shipped to the user immediately once the item remaining indicator 108 indicates that the amount of item left is below a second threshold level.

In accordance with at least some embodiments of subscription system 100, the shipping threshold or other thresholds may be set by the user. Thresholds may be set as general thresholds (i.e., set a shipping threshold of 35% for every item) or they may be set for a particular item or category of items (i.e., set a shipping threshold of 5% for toothpaste). In accordance with at least one embodiment, a user may set multiple thresholds. For example, a user may elect to set a threshold at which to be reminded to check the amount left for an item. In this example, the user may receive an email, text message, or other notification indicating that the subscription system 100 has calculated that the user has a certain amount of item left. The user may then be given the opportunity to provide a corrected estimate of the amount of item left.

In accordance with at least some embodiments of subscription system 100, a user may be given the ability to confirm each order before it is shipped via a confirmation button 116. Alternatively, the user may enroll a particular item into an automatic subscription service via an opt-in button 118. As part of the automatic subscription service, the item 104 may be shipped at any time once the consumption rate reaches the first threshold and immediately once the consumption rate reaches a second threshold (subject to availability of the item). However, while the item remaining indicator 108 is between the first and second threshold, the subscription system 100 may delay shipment of a particular item in order to bundle it with various other items enrolled in the automatic subscription service. For example, if item A falls below the first threshold and is ready to be shipped, the subscription system 100 may determine that item B also needs to be shipped and item C will fall below the shipping threshold within two days. If the subscription system 100 determines that neither item A or item B's item remaining indicator 108 will fall under the second threshold in that time period, the subscription system 100 may delay shipping of each of the items until all three can be sent. By aggregating shipping of items in this fashion, shipping costs may be reduced. Additionally, the subscription system may attempt to take advantage of available sales and coupons. For example, if item A is currently on sale, but that sale will expire just before item A is to be renewed for a user, the subscription system 100 may ship the item early to take advantage of the sale price. In accordance with at least one embodiment, the user may be notified and/or an approval me be sought from the user prior to approving this purchase. Alternatively, the subscription system 100 may purchase the item prior to the expiration of the sale and hold the item until it is to be shipped to the user.

Figure 2:
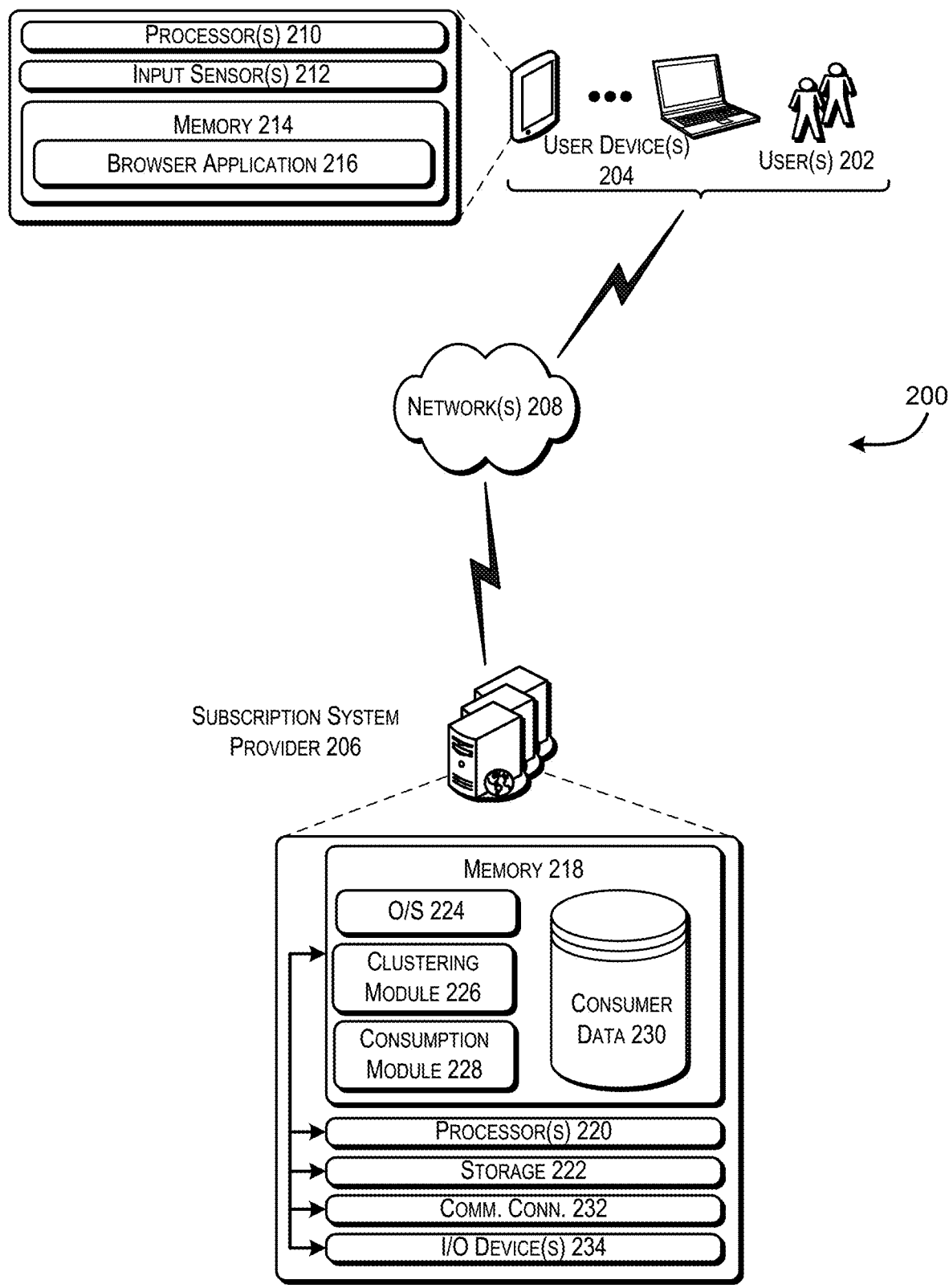
FIG. 2 depicts an illustrative example of a sample architecture in which techniques may be implemented for determining an item consumption rate and enabling automatic renewals based on that item consumption rate in accordance with at least one embodiment.

FIG. 2 depicts an illustrative example of a system or architecture 200 in which techniques for calculating a consumer consumption rate for a product may be implemented. In architecture 200, one or more consumers and/or users 202 may utilize user devices 204. In some examples, the user devices 204 may be in communication with a subscription system provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the software modules on the user device 204 may be stored and executed from its memory 214, which may include a browser application 216.

In some examples, the network(s) 208 may include any one or a combination of many different types of networks, such as cable networks, the Internet, wireless networks, cellular networks, and other private and/or public networks. While the illustrated example represents the users 202 utilizing the browser application 216 to access information or services over the network(s) 208, the described techniques may equally apply in instances where the users 202 interact with a subscription system provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a subscription system provider 206, such as to store, access, and/or manage data, develop and/or deploy computer applications, and/or host web content. The one or more subscription system(s) 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The subscription system provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the subscription system provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the subscription system provider 206 may include at least one memory 218 and one or more processing units (or processor(s)) 222. The processor(s) 220 may be implemented as appropriate in hardware, computer-executable instructions, firmware or combinations thereof. Computer-executable instruction or firmware implementations of the processor(s) 220 may include computer-executable or machine executable instructions written in any suitable programming language to perform the various functions described.

The memory 218 may store program instructions that are loadable and executable on the processor(s) 220, as well as data generated during the execution of these programs. Depending on the configuration and type of subscription system provider 206, the memory 218 may be volatile (such as random access memory (RAM)) and/or non-volatile (such as read-only memory (ROM), flash memory, etc.). The subscription system provider 206 may also include additional storage 222, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 218 may include multiple different types of memory, such as static random access memory (SRAM), dynamic random access memory (DRAM) or ROM. Turning to the contents of the memory 218 in more detail, the memory 218 may include an operating system 224 and one or more application programs or services for implementing the features disclosed herein including at least a module for creating consumer commonality clusters (clustering module 226) and at least a module for predicting item-related consumer consumption models (consumption module 228). The memory 218 may also include consumer data 230, which provides information related to consumers, item consumption rates, and item purchase history. In some embodiments, the consumer data 230 may be stored in a database.

The memory 218 and the additional storage 222, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the subscription system provider 206. The subscription system provider 206 may also contain communications connection(s) 232 that allow the subscription system provider 206 to communicate with a stored database, another computing device or server, user terminals, and/or other devices on the network(s) 208. The subscription system provider 206 may also include input/output (I/O) device(s) and/or ports 234, such as for enabling connection with a keyboard, a mouse, a pen, a voice input device, a touch input device, a display, speakers, a printer, etc.

In accordance with at least one embodiment, the clustering module 226 may be configured to determine, based on data related to a user (e.g., demographic information, item consumption rates, or item purchase history information), a "cluster" or group of consumers to which the user likely belongs. The clustering module may assign a consumer to a cluster based on item purchases, geographic vicinity, economic similarities, or any other suitable information related to the consumer. This is described in greater detail elsewhere in the disclosure.

In accordance with at least one embodiment, the consumption module 228 may be configured to determine a consumption rate for a particular item, person, or a combination of the two. In accordance with at least one embodiment, the consumption rate for the particular item for the particular person may be a consumption rate that is common to a particular cluster of consumers. In accordance with at least one embodiment, the consumption rate for the particular item for the particular person may be a consumption rate constructed by combining an underlying consumption rate for the item with a common consumption rate for a cluster or group and/or a personal consumption rate. This is described in greater detail elsewhere in the disclosure.

In accordance with at least one embodiment, the consumption module 228 may be configured to estimate a consumption rate from a number of factors. For example, although the rate of item purchases for a consumer is different from the rate at which the consumer consumes the item, they are often correlated in that a consumer is more likely to purchase a replacement item when the old one is empty. Accordingly, item purchases may be used to approximate or estimate a consumption rate. For example, the way in which an underlying consumption rate for an item fluctuates in response to the occurrence of an event can be determined by identifying an average use and/or purchase of the item around the time of the event. In some cases, the purchase of the good may be a lagging indicator of the item's underlying consumption rate. For example, a large number of consumers may purchase lip balm at the beginning of the spring season. This may indicate a higher usage of lip balm in the prior winter season as opposed to a current consumption rate for the spring season.

In accordance with at least some embodiments, the consumption module 228 may be configured to take into account economic factors. For example, if the economy is trending upward, then the consumption rate of items marked as superior goods may be increased accordingly. Furthermore, the subscription system may take into account the elasticity of an item (the increase or decrease in purchases of the item in response to a change in the price of the item). For example, if the price for an item with a high elasticity increases, one should expect purchases of the good to drop. However, the consumption rate of the item would likely remain unchanged in that case.

In accordance with at least one embodiment, people may be clustered into like groups by the clustering module 226 and the consumption module 228 may be configured to determine a common consumption rate for a group of people. In some cases, consumers may be clustered based on demographic information. For example, people who live in a colder area are more likely (on average) to have a higher consumption rate of lip balm than those who live in warm areas. In accordance with at least one embodiment, a common consumption rate for lip balm may take into account how far north a group of consumers lives. Alternatively, customers may be grouped based on item purchases on the basis that people who live under similar conditions often make similar purchases. In accordance with at least one embodiment, changes made by one or more consumers in a clustered group may affect the common consumption rate of the group. Under this schema, there may be no need to analyze the underlying cause of fluctuations in the common consumption rate.

In accordance with at least some embodiments, the consumption module 228 may be configured to determine a personal consumption rate for a particular consumer that is unusual. For example, a person may have a particular consumption rate for the item that is outside of the common consumption rate. For example, a person may be very fond of an item and may consume a larger amount of the product than a typical consumer (even one with similar interests). The personal consumption rate for that item may be adjusted upward. In general, a consumer's personal consumption rate of an item may be determined based on past orders, indicated preferences, indications that the consumption rate is not accurate, or any other suitable factor. For example, the time between purchases of the item may help indicate the rate at which the person is consuming the item. In accordance with at least one embodiment, personal consumption rates may vary according to the particular person as well as seasonality. For example, some consumers may use more dish detergent during the holiday season as those consumers host friends and family. On the other hand, some consumers may use less dish detergent during the holiday season as those consumers are being hosted by friends and family.

Consumer data 230 may be predetermined or it may be dynamically generated. For example, consumption rates and clusters may be updated in real time as input is received. For example, consumers may be added to or removed from various clusters as purchases are made. Furthermore, consumption rates may vary any time that new data is received. In accordance with at least one embodiment, consumer data 230 may include purchase history data, purchasing trend data, underlying item consumption rates, common consumption rates for clusters of consumers, personal consumption rates for a particular user and/or a particular item, or any other suitable consumer-related information.

Although the clustering module 226, the consumption module 228, and consumer data 230 are depicted in FIG. 2 as being implemented in the memory 218 of the subscription system provider 206, it is envisioned that one or more of the clustering module 226, the consumption module 228, and consumer data 230 could also be implemented in the memory 214 of the user device 204. In some embodiments, a portion of the described subscription system functionality may be performed at either the subscription system provider 206 by the clustering module 226 or the consumption module 228 and/or at the user device 204 by the processor(s) 210. It is intended that this disclosure encompass any combination of these implementations.

FIG. 3 depicts an illustrative user setup display screen 300 for an item subscription system in accordance with at least one embodiment. In FIG. 3, a user is given the ability to provide various criteria when adding a new item 302 to an item subscription system. For example, the user may be given the ability to specify the quantity 304 of the item that is to be shipped in each recurring shipment of the item.

In accordance with at least one embodiment, a user may be given the ability to provide threshold criteria for each item added to the subscription system. Thresholds may be set with respect to consumption rates in that the threshold is reached when a certain amount or useful life is left for a product. For example, the user may indicate that a replacement product should be sent to him once he has only 10% of the product left. In at least some embodiments, the user is able to identity a first threshold that represents the earliest that an item may be shipped, which will be referred to as a first shipping threshold 306 for the purposes of this disclosure. The user may also specify a threshold at which the product should immediately be shipped, which will be referred to as an immediate shipping threshold 308 for the purposes of this disclosure. In accordance with at least one embodiment, a user may be provided with the ability to specify one or more additional thresholds 310 associated with various actions. In accordance with at least one embodiment, the subscription system may provide threshold recommendations 312 for the user, which may be based on a consumption rate and/or an average shipping time. For example, if the average shipping time for item A is one week and the consumption rate of item A is one month (one of item A is consumed every 30 days), then the subscription system may recommend immediate shipping once the item is at 23.3% (seven days divided by 30 days) so that the consumer is likely to receive the replacement item A just as he or she runs out. In this example, the subscription system may also recommend a shipping threshold of 40% so that item A may be shipped any time that the consumer has less than 40% of the product left. In accordance with at least one embodiment, a user may also provide additional criteria 314 for the subscription system. For example, in a subscription system, the user may request that the system obtain permission before purchasing any products that have substantially increased in price. This gives the consumer the ability to review the purchase prior to shipping as well as providing the user with the opportunity to switch products. In accordance with at least some embodiments, the user may be given the ability to provide one set of thresholds that apply to each item in the subscription system for that user.

In typical item subscription systems, the system or its consumers tend to schedule item renewals at particular times of the month. For example, most consumers elect to refill items at the beginning or end of the month. This often results in demand spikes around those times that can cause fulfillment issues (i.e., issues in purchasing, warehousing, delivery, etc.). One advantage of the current disclosure is that it eliminates or at least reduces these demand spikes since each consumer is being sent renewals at a different rate. In particular, each item is renewed for a consumer based on the amount of the item they have left and the rate at which they consume the item, which results in different renewal dates for each consumer. In accordance with at least one embodiment, an item may be shipped to a consumer at any time that the consumption rate indicates that the amount of the item left is between the first shipping threshold and the immediate shipping threshold. The subscription system may be configured to minimize the number of shipments made to a consumer in order to reduce shipping costs and improve efficiency. Furthermore, this aggregation of shipping is more environmentally friendly (because it decreases packaging) and creates a more pleasant customer experience, as the consumer is likely to be more satisfied receiving a single package as opposed to multiple packages. To do this, the subscription system may aggregate several items into a single shipment. In accordance with at least one embodiment, shipments may be sent in response to an item reaching the immediate shipping threshold and may be aggregated to include all items below the first shipping threshold. For example, when a first item A reaches an immediate shipping threshold, a shipment may be filled for the consumer that contains item A along with any other items for which the consumption rate indicates that the amount of the item left is below the first shipping threshold. The subscription system may identify a number of items that are currently, or will soon be, below the first shipping threshold for shipment to a consumer. In accordance with at least some embodiments, the subscription system may be configured to create a shipping schedule that minimizes the number of shipments necessary to ship the subscribed items based on current consumption rates for those items. In accordance with at least some embodiments, the items may be selected for aggregated shipping based on a number of item attributes including size, weight, shipping requirements, and/or any other suitable attribute. For example, a number of items that need to be refrigerated during shipping may be aggregated into a single shipment when they are each ready to be shipped. Although this example highlights an embodiment in which a user is given the ability to set various thresholds, one or more thresholds may be set by the subscription system.

Figure 4:
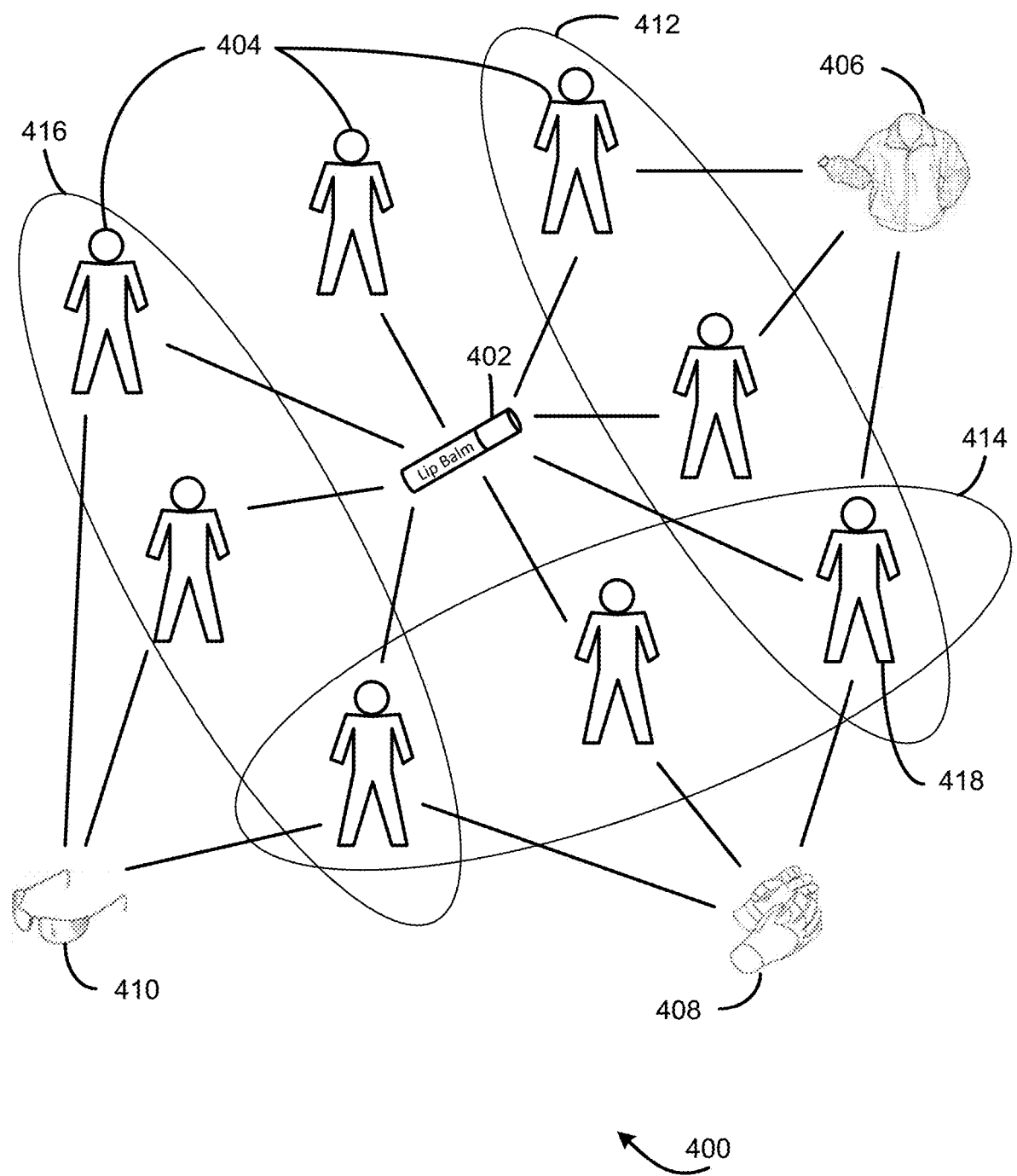
FIG. 4 depicts an illustrative example of consumer clustering based on item purchases that may be modeled by a clustering module in accordance with at least one embodiment.

FIG. 4 depicts an illustrative example of consumer clustering based on item purchases that may be modeled by a clustering module in accordance with at least one embodiment. A clustering module capable of creating this model may be an example implementation of a clustering module 226 as depicted in FIG. 2. In FIG. 4, an item 402 (or item category) is depicted as being purchased by a number of consumers 404. Various items 406, 408, and 410 are also depicted as having been purchased by some of the consumers 404. In FIG. 4, straight lines between consumers and items represent consumer purchases of the item by the connected consumer. In this example, several clusters, or groupings, of consumers may be created for the purposes of calculating similar consumption models. For example, clusters 412, 414, and 416 are depicted as groupings of consumers that have purchased items (or item categories) 406, 408, and 410 respectively in addition to the item 402. In accordance with at least some embodiments, clusters may overlap (as depicted in FIG. 4). In accordance with at least some embodiments, a new cluster may be created where the clusters would normally overlap. For example, consumer 418 may be included in both cluster 412 and cluster 414. Alternatively, consumer 418 may belong to a separate cluster that includes the consumers that have purchased both items 406 and 408.

In accordance with at least one embodiment, a cluster may be used to group a number of consumers with similar interests and/or needs. These clusters may then be utilized to create a common consumption rate for an item 402 being purchased. When attempting to calculate a consumption rate for a particular item and for a particular consumer, cluster data can be used to extrapolate consumption rate data from other consumers in the cluster. For example, consider a scenario in which a particular consumer purchases dish detergent around the holiday season. The subscription system may not be able to determine a consumption rate from this purchase by itself, as some consumers may use more dish detergent during the holiday season as they host friends and family and some consumers may use less dish detergent during the holiday season as they are being hosted by friends and family. However, if the particular consumer's item purchases also include a ham, a turkey, a tofurky, a turducken or any other item that would fit into a category of a holiday main dish, then the consumer may be hosting. In this example, the consumer may be clustered with other consumers making the same purchases, each of which is more likely to have a higher consumption rate. Alternatively, item purchases may be more subtle than a main dish purchase. For example, the system may detect an increase in napkin purchases or an increase in household cleaning supplies in general (that may be associated with entertaining additional guests). In accordance with at least one embodiment, the subscription system may instead receive another indication from the consumer that an item is being consumed. For example, the consumer may adjust his or her consumption rate of napkins by indicating that he or she is almost out. These are a few examples that may indicate a higher consumption rate for this particular consumer for dish detergent. Alternatively, the consumer may have purchased a side dish, transportable food storage containers, or other items that are commonly purchased by consumers that are being hosted. The consumer may then be clustered according to these item purchases (with others who have made them) to determine a consumption rate for the particular consumer for dish detergent. By way of a second illustrative example, consider a scenario in which a consumer purchases a bottle of shampoo. The system may also detect that the person has purchased products intended for men as well as products intended for women. The system may then determine that this consumer account is used by multiple parties and the consumer may be clustered with other aggregated household accounts, which may result in a higher consumption rate for the purchased shampoo on the basis that at least two people are consuming it.

In accordance with at least one embodiment, consumer clusters may change as consumers are added to or removed from a cluster and a consumption rate for a particular item may be dynamically adjusted. For example, a consumer may be a host for one event and might be hosted in several others. In some embodiments, the clustering module may attempt to fit each consumer into only one cluster at a time for a particular item. For example, the clustering module may cluster the consumer based on only his or her most recent item purchases. In embodiments in which a single consumer is clustered into multiple clusters, a consumption rate for a particular item may be a product of multiple common consumption rates for each of the clusters. For example, each of the clusters' consumption rates for a particular item may be weighted in accordance with how well a consumer fits into the group.

In accordance with at least one embodiment, the consumption rate for a consumer for a particular item may be the common consumption rate of the cluster to which the consumer currently belongs. In some those embodiments, any change in consumption detected with respect to the individual consumer may be imputed to the entire cluster. For example, a consumer that is clustered into cluster A with respect to item A may indicate (i.e., via the user interface 102 of FIG. 1) that he or she has more or less of item A left than is indicated by the subscription system. In this scenario, the common consumption rate of cluster A may be adjusted in response to that indication with respect to item A.

Figure 5:
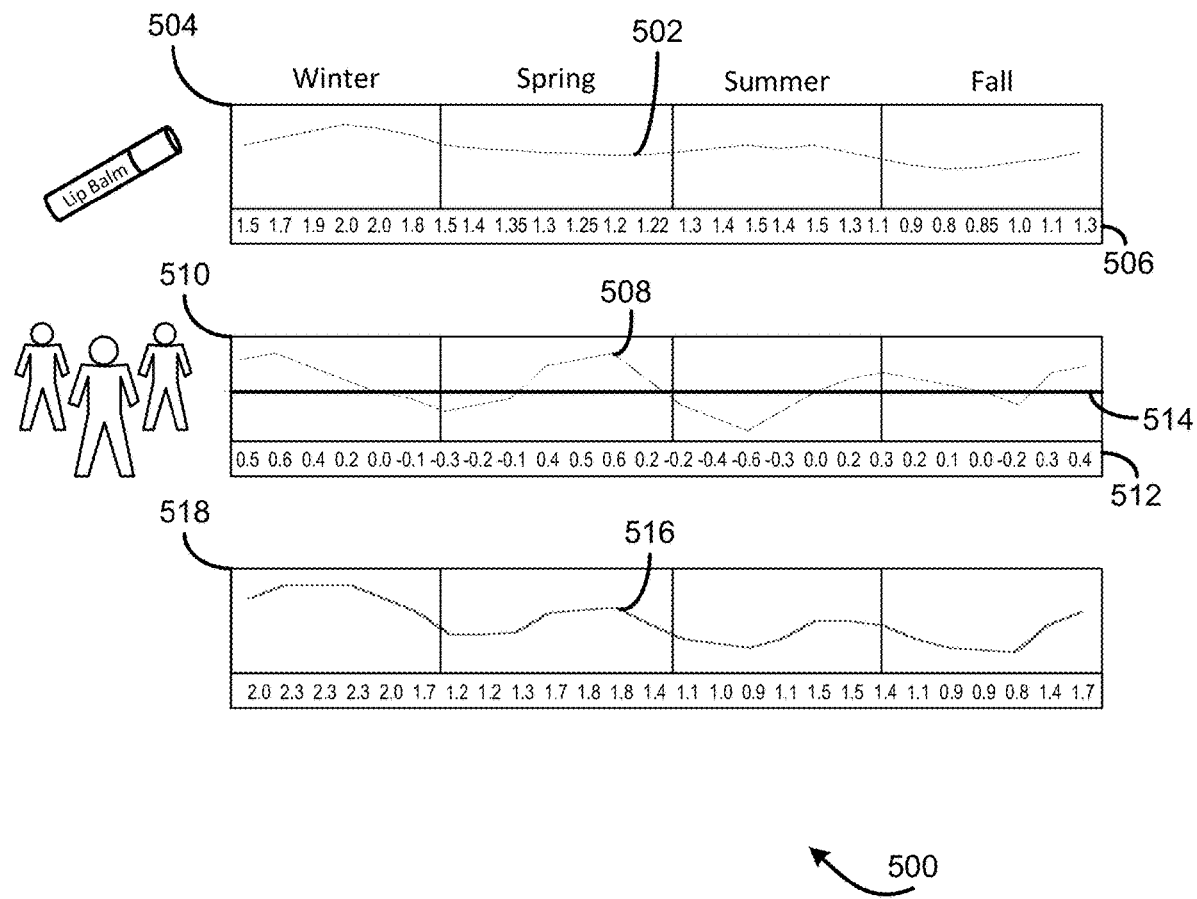
FIG. 5 depicts an illustrative example of one method of determining an overall consumption rate in accordance with at least one embodiment.

FIG. 5 depicts illustrative examples of various consumption rates 500, including an underlying item consumption rate, a common consumption rate for a cluster of consumers, and an overall consumption rate. In accordance with at least some embodiments, an underlying item consumption rate 502 may be stored as a function with respect to time in timeline 504. In accordance with at least some embodiments, an underlying item consumption rate 502 may be represented by a series of data points 506. In accordance with at least one embodiment, an underlying item consumption rate 502 may be stored as a singular value. In accordance with at least some embodiments, the underlying consumption rate of an item may be stable (unchanging) for a period of time, such as a month or a season. In some of these embodiments, the underlying consumption rate may be represented as a different stable value for each period of time. For example, usage of particular lipstick colors is often seasonal in nature. Accordingly, a "fall color" lipstick may have a high consumption rate in the fall season as it is being used daily and a very low consumption rate in winter, spring and summer. In this example, a subscription system may assign the same high consumption rate to the lipstick throughout the fall season and may assign the same low consumption rate throughout the rest of the year. A subscription system may utilize a number of techniques for determining a consumption rate for a particular item. For example, the provider of the subscription system may use sales of the item from past years, data extrapolated from current and recent sales, data from market focus groups, or any other suitable source of consumption information. In addition, there may be a number of leading indicators that the provider of the subscription system may use. For example, a popular magazine may advertise a particular fashion, for which the subscription system may predict a gain in popularity (and subsequently a higher consumption rate).

In accordance with at least one embodiment, an underlying item consumption rate 502 may be stored as a singular value (as opposed to a function or a series of data points) which is dynamically adjusted in response to receiving new data. For example, the subscription system may detect a higher number of sales for the item, which may also indicate that the item is being consumed at a faster rate, and may update underlying item consumption rate 502 for that item. In at least some of these embodiments, the subscription system may determine the amount of an item that is left by first determining the amount of the item that has been used based on past underlying item consumption rates for the item. The subscription system may then determine a renewal date by applying the current underlying item consumption rate 502 to the amount of the item that is left. In accordance with at least some embodiments, the underlying item consumption rate 502 may be the current consumption rate of the item determined as a product of item sales over the subscription system's entire customer base or some portion thereof. For example, if 1000 of item A are purchased per month by 500 different consumers, then the underlying item consumption rate may be estimated for item A to be 2.0 per month (using an assumption that purchases are correlated with consumption). In accordance with at least one embodiment, the subscription system may calculate the current underlying item consumption rate based on recent sales data. For example, at time $T_1$, the subscription system may determine that 1000 of item A were purchased in the last 30 days by 500 different consumers. The subscription system may set the underlying item consumption rate at 2.0. At time $T_2$, the subscription system may determine that only 900 of item A were purchased in the last 30 days by 550 different consumers. The subscription system may then adjust the underlying item consumption rate to be 1.64. The time interval between times $T_1$ and $T_2$ may be any size (e.g., a day, a minute, a second, etc.). Any change in the underlying consumption rate may dynamically propagate new renewal dates for each consumer who has subscribed to the item. In the current scenario, an underlying item consumption rate being adjusted from 2.0 to 1.64 may result in a renewal date for that item that is farther in the future.

In accordance with at least some embodiments, a common consumption rate 508 for a cluster of consumers may be stored as a function with respect to time in timeline 510. In accordance with at least some embodiments, a common consumption rate 508 may be represented by a series of data points 512. In accordance with at least one embodiment, a common consumption rate 508 may be stored as a singular value that may be adjusted dynamically. In accordance with at least one embodiment, the common consumption rate 508 may be presented relative to an average consumer 514. For example, a common consumption rate 508 of 0.2 may indicate that this consumer is consuming 0.2 more of the item per time period than an average consumer. A common consumption rate 508 may also be negative. For example, a common consumption rate 508 of −0.2 may indicate that this consumer is consuming 0.2 less of the item per time period than an average consumer. In these embodiments, the common consumption rate 508 may be combined with an underlying item consumption rate 502 to construct an overall consumption rate 516 (as depicted as a function with respect to time in timeline 518) for each consumer in the cluster of consumers for the item.

In accordance with at least one embodiment, the common consumption rate 508 may be stored as a singular value (as opposed to a function or a series of data points) which is dynamically adjusted in response to receiving new data. For example, the subscription system may detect a higher number of sales for the item in a cluster of consumers, which may also indicate that the item is being consumed at a faster rate by those consumers, and may update the common consumption rate 508 for the cluster of consumers for that item. The common consumption rate 508 may be adjusted each time that a particular consumer in the cluster indicates that the current consumption rate is off. For example, a particular consumer may update a consumption rate indicator to notify the subscription system that he or she has more or less of an item left than is currently shown. In this scenario, the subscription system may adjust the common consumption rate 508 of at least one cluster in which the particular consumer has been grouped.

In accordance with at least one embodiment, the overall consumption 516 may be calculated to include the underlying item consumption data as well as the common consumption rate for a cluster. For example, the subscription system may determine that 1000 of item A are purchased per month by 500 different consumers who are in a cluster. The subscription system may further estimate the overall consumption 516 for the clustered consumers and for item A to be 2.0 per month. One skilled in the art would recognize that this sort of calculation may eliminate the need to calculate an underlying item consumption rate 502 and a common consumption rate 508 separately.

In accordance with at least one embodiment, consumption rate information may be used in a variety of ways. In some embodiments, purchase recommendations or pricing recommendations may take into account consumption rate data. For example, one brand of a particular item may last longer (on average) than other brands in that product category. In this scenario, the subscription system may provide a recommendation to a potential consumer who is considering purchasing a product from the category along the lines of "brand X typically lasts Y days longer on average than other brands." By way of a second example, a pricing model may be implemented in which a higher price is recommended for products that typically last longer than products that do not last as long.

Figure 6:
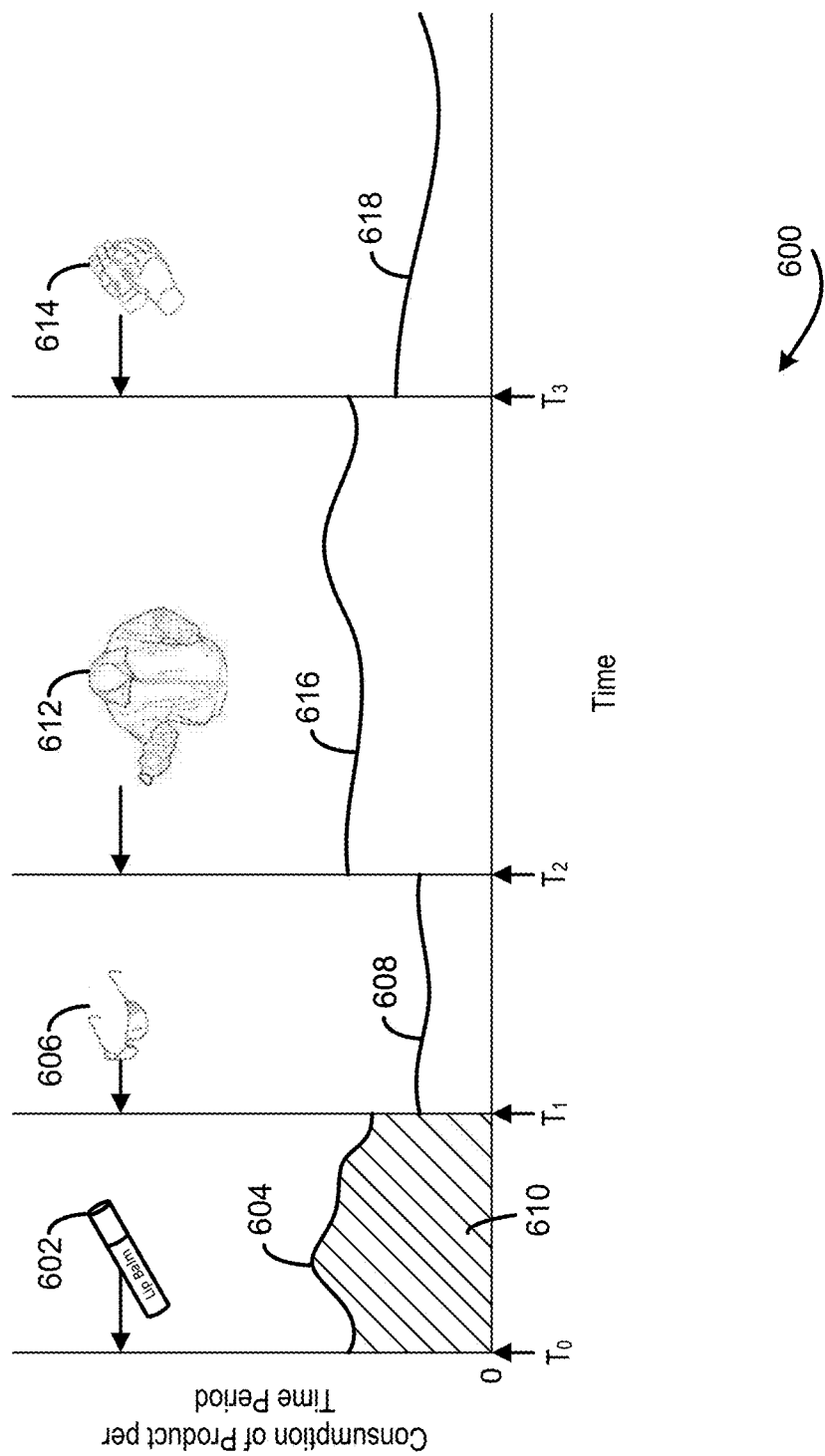
FIG. 6 depicts an illustrative example of a consumption rate for a particular item that is dynamically altered over a period of time in accordance with at least one embodiment.

FIG. 6 depicts an illustrative example of a dynamically altered consumption rate for a particular item over a period of time in accordance with at least one embodiment. In some embodiments, a consumption rate for a consumer for a particular item may be dynamically adjusted based on current cluster data. For example, as a consumer makes item purchases, he or she is added to or removed from various clusters. Consumption rates may or may not also take into account an underlying consumption rate of a particular item. In FIG. 6, timeline 600 is provided to illustrate dynamic adjustments in the consumption rate for a particular individual as items are purchased. In particular, the timeline relates to a consumption rate for item 602. In timeline 600, item 602 is purchased by a consumer at time $T_0$. An initial consumption rate 604 is provided for the consumer. In accordance with at least one embodiment, the initial consumption rate may be a default consumption rate or the underlying consumption rate of the item 602. This may be the case when no purchase history is available for a particular consumer.

In accordance with at least one embodiment, additional items may be purchased by the consumer that will have an effect upon the consumption rate. For example, item 606 may be purchased at time $T_1$. Upon making the purchase of item 606, a clustering module may identify a cluster in which the consumer belongs along with a corresponding consumption rate 608 for that cluster for item 602. The subscription system may then calculate the amount of product that is left and apply the new consumption rate to the future use of the product for the purpose of determining renewal dates.

In some embodiments, a consumption rate may be stable or unchanging for a particular cluster of consumers or for a particular item. However, as pointed out throughout this disclosure, a consumption rate for a particular cluster of consumers or item may fluctuate over a period of time. Alternatively, a common consumption rate for a cluster of consumers may be stable but the consumption rate for the underlying item may fluctuate with respect to time (e.g., based on seasonality). In that scenario, one would expect to see fluctuations in the overall consumption rate with respect to time. In accordance with at least some embodiments, the fluctuations of a consumption rate over time may be represented as a function with respect to time or at least a series of data points. A subscription system is then able to determine the amount of product left at any given time as an integration of the function (or a function fitting the series of data points). For example, in the depicted figure, the amount of item 602 that has been consumed at time $T_1$ (assuming that the product was full at time $T_0$) can be approximated by the equation:

$$\text{Amount Used} = \int_{T_0}^{T_1} f(x)dx$$

In this example, the amount of item 602 that has been used at time $T_1$ can be approximated by taking the integral of the function representing the consumption rate, f(x), with respect to time. In other words, the amount of item 602 used at time $T_1$ may be approximated by the area under the consumption rate curve, or shaded area 610. In accordance with at least one embodiment, an amount of product used could also be approximated by summing a series of data points. It also stands to reason that the amount of item 602 that is left at any given time can be calculated as the amount purchased at time $T_0$ minus the amount used.

In accordance with at least one embodiment, the amount of product left may be adjusted periodically. For example, the amount of product left may be adjusted hourly, daily, on a millisecond basis, or each time that a consumption rate is determined or adjusted. By way of specific example, which is intended to be non-limiting, consider the scenario in which the subscription system has determined that there is 90% of item A left on day one. Assume that the current consumption rate is 5.0 of item A per month (30 days) and the amount of product left is updated daily (every 24 hours). On day two, assuming that the consumption rate remains unchanged, the subscription system may update the item to indicate that there is 73% of item A left. This can be determined by taking the original amount (0.9) minus the consumption rate (5.0) multiplied by the time interval (1/30). By way of further example, the amount of item left, along with the current consumption rate, may be used to identify a potential date upon which the consumer is expected to run out of the item. One way to do this is to use the renewal rate (or the inverse of the consumption rate) multiplied by the percentage of product left. Extending the above example, one could multiply 73% by 6 (30/5) to determine that the item is expected to run out in 4.4 days. Although this example is presented, one skilled in the art will recognize that there are a number of ways to approximate an amount of an item that is remaining and/or the time that it will take to fully deplete the item.

In accordance with at least one embodiment, a number of items can be purchased by the consumer that may affect the consumption rate of item 602 for that consumer. For example, the user may purchase item 612 at time $T_2$ and item 614 at time $T_3$. In each occurrence, the consumption rate for item 602 may be adjusted to match a common consumption rate for a new cluster in which the consumer now fits, such as consumption rates 616 and 618, which are assigned at times $T_2$ and $T_3$ respectively. In accordance with at least one embodiment, the consumption rate 616 may be common to a cluster of consumers that have each purchased items 612, 606, and 602. Alternatively, consumption rate 616 may be common to a cluster of consumers that has only purchases of items 612 and 602 in common. In accordance with at least one embodiment, the consumption rate 618 may be common to a cluster of consumers that have each purchased items 614, 612, 606, and 602. Alternatively, consumption rate 616 may be common to a cluster of consumers that has purchased any combination of items 614, 612, 606 and 602.

Figure 7:
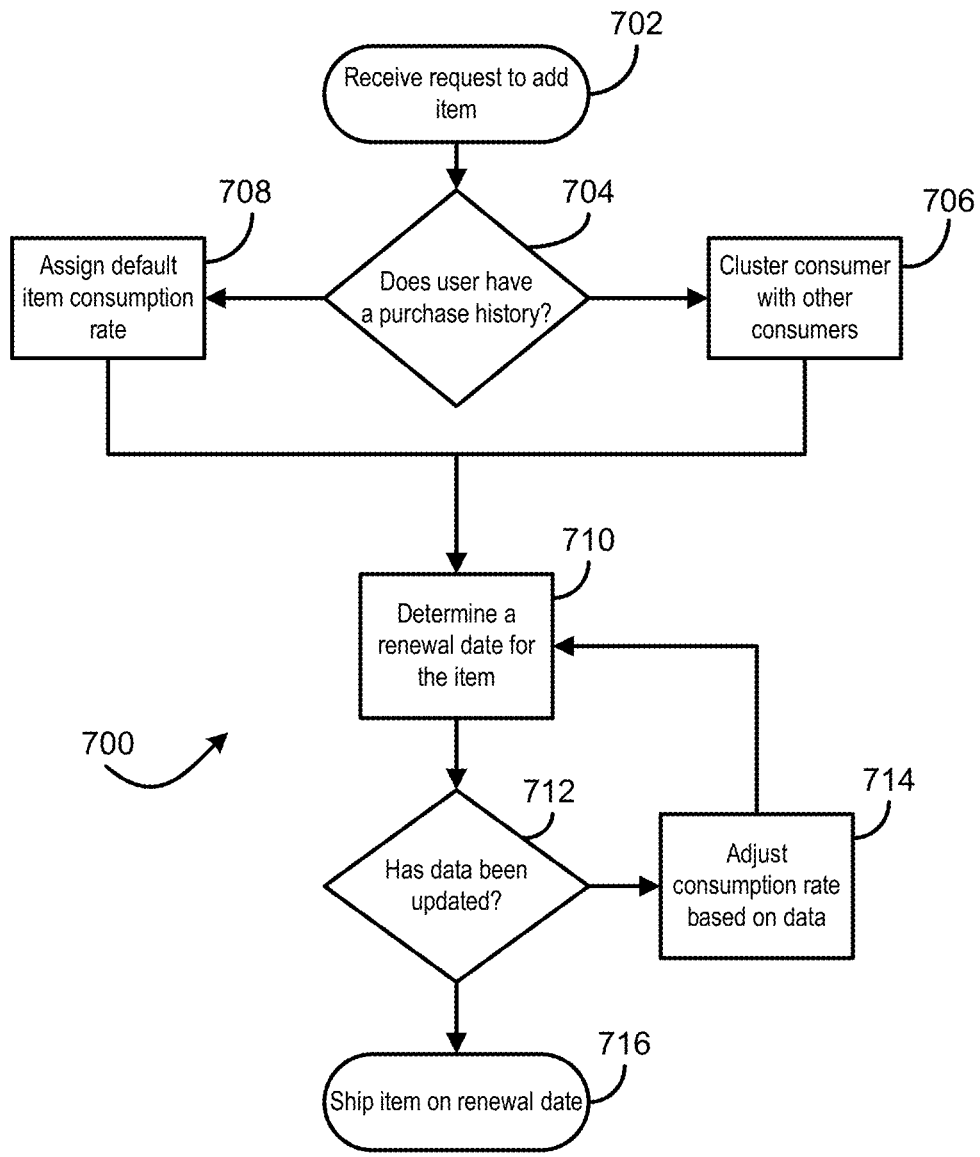
FIG. 7 is a flowchart depicting aspects of an example method for determining renewal dates for a subscribed item in accordance with at least one embodiment.

FIG. 7 is a flowchart depicting aspects of an example method for determining renewal dates for a subscribed item in accordance with at least one embodiment. Some or all of the process 700 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. In accordance with at least one embodiment, the process 700 of FIG. 7 may be performed by at least the one or more subscription system providers 206 shown in FIG. 2. The code may be stored on a computer-readable storage medium, for example, in the form of a computer program including a plurality of instructions executable by one or more processors. The computer-readable storage medium may be non-transitory.

The process 700 may begin at 702 when a request is received by a consumer to add an item to their subscribed items. In accordance with at least one embodiment, the consumer may select the item from an online marketplace and elect to opt into an automatic fulfillment program for the item. The consumer may be given an initial consumption rate for that item, which may be based on the consumer's current purchase history. For example, at 704, the subscription system may determine whether the consumer has a relevant purchase history, and if so, whether that consumer should be clustered with another group of consumers for the purpose of determining a consumption rate for the item. If the consumer has made relevant purchases in the past, then the subscription system may cluster the consumer with similar consumers based on his or her purchase history at 706. In accordance with at least one embodiment, a common consumption rate for the cluster may be provided as an initial consumption rate for the consumer for that item. If the consumer has not made relevant purchases, those purchases are not recent, or the consumer does not otherwise fit within a cluster, then the subscription system may assign a default consumption rate for the consumer for that item at 708. A default consumption rate may be the underlying consumption rate for the item.

Once an initial consumption rate has been determined for the consumer for the item, a renewal date may be determined by the subscription system at 710. In at least some embodiments, the subscription system may determine a renewal rate. In these embodiments, a renewal date may be determined based on average shipping times and the renewal rate. For example, if the renewal rate indicates that the item should be renewed three weeks from the current date and the average shipping time is one week, then the renewal date may be set for two weeks from the current date. In at least some embodiments, a renewal date may be selected by the subscription system to minimize the number of shipments sent to the consumer or to maximize the use of coupons or other sale prices. In some of these embodiments, a threshold may be provided such that the item may be renewed at any time that the determine amount of item left falls below the provided threshold. In some of these embodiments, a second threshold may also be provided such that the item may be renewed immediately once the determine amount of item left falls below the provided second threshold.

In accordance with at least one embodiment, the consumption rate may be updated at some point before the renewal data is reached. For example, the consumer may make a purchase that causes the subscription system to include the consumer in a different cluster (with a different consumption rate) than he or she was in previously. Alternatively, the item purchase history that was used to cluster the consumer may become outdated and the consumer may be removed from that cluster. In at least some embodiments, the consumer may provide an indication that the amount of item left that is indicated by the subscription system is wrong. In these embodiments, the amount of item left may be updated by the subscription system and the consumption rate may be updated. If the subscription system detects an update to relevant consumer data at 712, then it may adjust the consumption rate at 714 accordingly. Once the consumption rate has been adjusted (either by the subscription system or the consumer), the renewal dates may be dynamically updated. If no data updates are detected at 712 by the subscription system by the renewal date, then the item is shipped on that date at 716. In at least some embodiments, authorization may be requested from the consumer prior to shipping the item at 716. For example, the consumer may be presented with a notification that the item is ready to be shipped and request for authorization at some point in time prior to or on the renewal date. In these embodiments, the item may not be shipped without the consumer's authorization.

Figure 8:
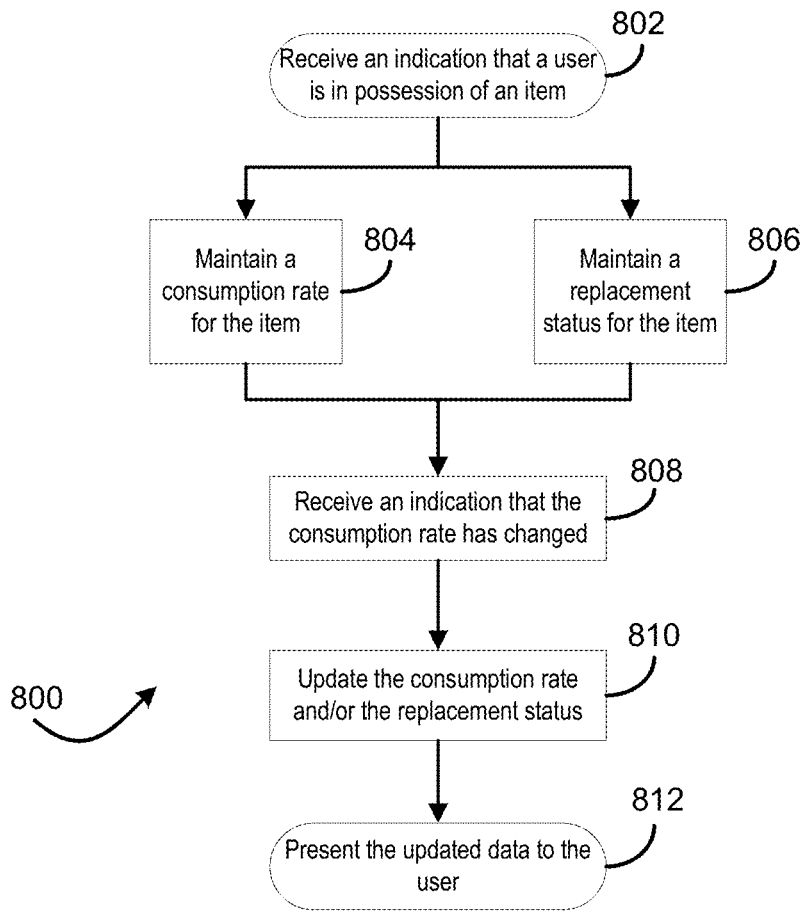
FIG. 8 is a flow diagram depicting aspects of an example method for dynamically adjusting a replacement status for a subscribed item in accordance with at least one embodiment.

FIG. 8 is a flow diagram depicting aspects of an example method for dynamically adjusting a replacement status for a subscribed item in accordance with at least one embodiment. In accordance with at least one embodiment, the process 800 of FIG. 8 may be performed by at least the one or more subscription system providers 206 shown in FIG. 2. The code may be stored on a computer-readable storage medium, for example, in the form of a computer program including a plurality of instructions executable by one or more processors. The computer-readable storage medium may be non-transitory.

The process 800 may begin at 802 when an indication is received that a user is in possession of an item. In one example, the user may purchase an item from an electronic marketplace. In another example, the user may provide an indication to a subscription service that he or she has X amount of the item, where X is a percentage or quantity. Once the subscription system is able to determine that the user has the item, it may assign a consumption rate at 804 and/or a replacement status at 806. For example, the subscription system may assign a default or initial consumption rate at which the item is predicted to be consumed. Based on this initial consumption rate, the subscription system may calculate an amount left of the product or a date on which the item will need to be replaced.

In accordance with at least one embodiment, the subscription system may receive an indication that the consumption rate has changed at 808. For example, the underlying consumption rate of the item may have been affected by an external market, such as a change in the economy, a fad, a seasonality, or an event. Alternatively, the consumer may have been re-clustered based on updated information related to the consumer. The new cluster into which the consumer has been placed may have a different consumption rate than the previous cluster in which the consumer had been placed. Once a change is detected in the consumption rate, the maintained consumption rate as well as the replacement status may be updated at 810. A change in the consumption rate may be triggered by the subscription system or by the consumer via a user interface, such as user interface 102 depicted in FIG. 1. The updated replacement status may be presented to the consumer at 812. The replacement status may appear as a pending shipment date, progress bar, or another suitable indication of a future item replacement.

Figure 9:
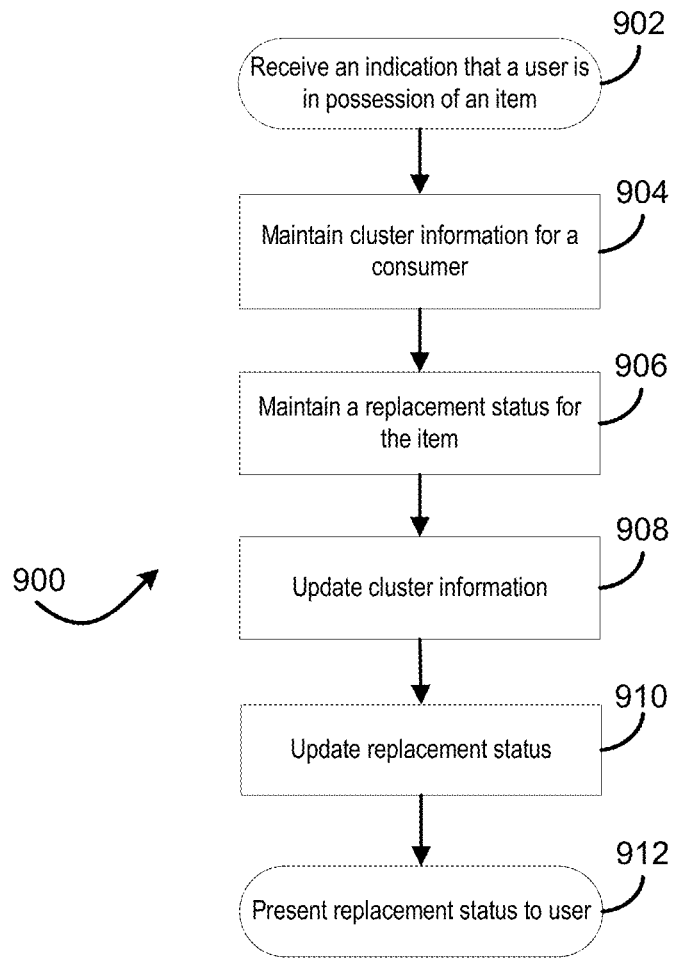
FIG. 9 is a flow diagram depicting aspects of an example method for determining consumption rates for a subscribed item based on consumer clusters in accordance with at least one embodiment.

FIG. 9 is a flow diagram depicting aspects of an example method for determining consumption rates for a subscribed item based on consumer clusters in accordance with at least one embodiment. Some or all of the process 900 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. In accordance with at least one embodiment, the process 900 of FIG. 9 may be performed by at least the one or more subscription system providers 206 shown in FIG. 2. The code may be stored on a computer-readable storage medium, for example, in the form of a computer program including a plurality of instructions executable by one or more processors. The computer-readable storage medium may be non-transitory.

The process 900 may begin at 902 when an indication is received that a user is in possession of an item. In one example, the user may purchase an item from an electronic marketplace. In another example, the user may provide an indication to a subscription service that he or she has the item. Once the subscription system is able to determine that the user has the item, it may maintain or store cluster information for the consumer at 904. For example, the user may have been associated with a cluster based on demographic attributes of the user, item purchase history, or any other suitable user-related attribute. In some embodiments, the cluster may share a common consumption rate for the item that has been calculated based on the consumption of the item by members of the cluster. Additionally, a replacement status may be maintained or stored by the subscription system at 906. The replacement status may be calculated based on the common consumption rate of the cluster to which the user belongs.

In some embodiments, the subscription system may determine that a second cluster is more appropriate for the user than the one to which he or she is currently assigned. This might be triggered by an item purchase, a change in demographics (such as the user moving to another location), or the receipt of updated information. In these embodiments, the common consumption rate of the new cluster may replace the existing stored consumption rate at 908. In addition, the replacement status information may be updated based on the new consumption rate at 910. Once the replacement status information has been updated, it may be presented to the user at 912. The replacement status may appear as a pending shipment date, progress bar, or another suitable indication of a future item replacement.

Figure 10:
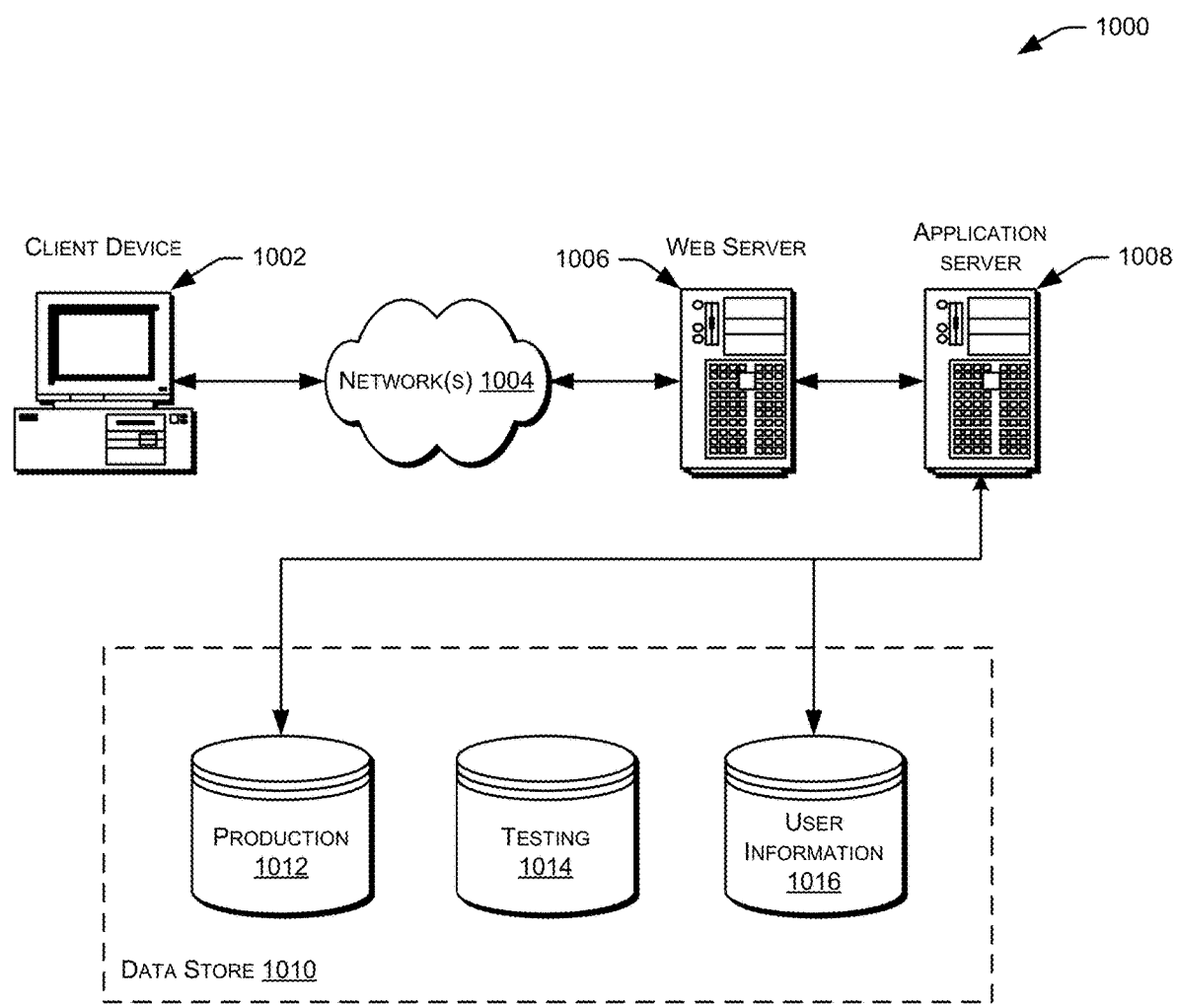
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving an indication that a user is in possession of an item, the item being subscribed to in an automatic subscription system;
   determining a first consumption rate for the item, the first consumption rate being a rate at which the item is predicted to be consumed based upon usage of the item by a broad consumer base, the usage calculated based on a purchase history associated with the broad consumer base;
   determining a first renewal date associated with the broad consumer base, wherein the first renewal date is based at least in part on the first consumption rate for the item;
   determining, based on a purchase history of the user, a consumer cluster in which the user belongs, wherein the consumer cluster comprises fewer users than the broad consumer base;
   determining a second consumption rate, the second consumption rate being a rate at which the item is predicted to be consumed based upon a purchase history associated with consumers within the consumer cluster;
   determining, based on the first consumption rate and the second consumption rate, a second renewal date for the item being a date upon which the item is to be replaced, wherein the second renewal date is different than the first renewal date based at least in part on a difference between the first consumption rate and the second consumption rate;
   upon determining that at least one of the first consumption rate or the second consumption rate has changed, determining a third renewal date for the item to replace the first renewal date for the item;
   updating, in substantially real-time, a replacement status indicator associated with renewal of the item for presentation on a user interface of a device associated with the user based at least in part on the third renewal date;
   receiving an authorization from the device associated with the user to ship the item, the authorization provided based at least in part on the updated replacement status indicator; and
   determining, by the automatic subscription system and based at least in part on the received authorization, an instruction to ship the item based at least in part on a difference between the third renewal date and the first renewal date.

2. The computer-implemented method of claim 1, wherein the indication that the user is in possession of an item is a purchase of the item by the user.

3. The computer-implemented method of claim 1, wherein at least one of the first consumption rate or the second consumption rate is determined from a function with respect to time.

4. The computer-implemented method of claim 1, wherein at least one of the first consumption rate or the second consumption rate is chosen from a series of data points, each data point in the series of data points associated with a date.

5. A system comprising:
   a processor; and
   a memory including instructions that, when executed with the processor, cause the system to, at least:
     maintain, for a user, an association between the user and a cluster of users, the association identified based on similarities in purchase patterns between the user and the cluster of users;
     determine, based on purchases of an item by a broad consumer base, a first consumption rate for an item;
     determine, based on purchases of the item by the cluster of users, a second consumption rate for the item, wherein the cluster of users comprises fewer users than the broad consumer base;
     determine, as a function of the first consumption rate and the second consumption rate, an overall consumption rate for the item;
     maintain a replacement status for the item, the replacement status calculated based at least in part from the overall consumption rate for the item;
     receive an indication that at least one of the first consumption rate or the second consumption rate has changed;
     update the overall consumption rate to reflect the changes from the received indication;
     update, in substantially real-time, a replacement status indicator corresponding to an updated replacement status for the item based at least in part on the update made to the overall consumption rate;
     cause presentation, to the user, of the updated replacement status indicator on a user interface of a device associated with the user;
     receive an authorization from the device associated with the user to ship the item, the authorization provided based at least in part on the updated replacement status indicator; and
     determine, based at least in part on the received authorization, an instruction to ship the item.

6. The system of claim 5, wherein the replacement status indicator for the item includes an indication of a time remaining before replacement of the item.

7. The system of claim 5, wherein the replacement status indicator for the item includes an indication of an amount of the item of which the user has possession.

8. The system of claim 5, wherein the indication that the overall consumption rate has changed is received in response to an external market force.

9. The system of claim 8, wherein the external market force is at least one of a change in an economy, a fad, a seasonality, or an event.

10. The system of claim 5, wherein the instructions further cause the system to at least update the replacement status for the item on a periodic basis.

11. The system of claim 5, wherein the replacement status indicator for the item is displayed as a status bar.

12. The system of claim 5, wherein the replacement status indicator for the item is displayed as a percentage.

13. A non-transitory computer readable storage memory device storing specific computer-executable instructions that, when executed by a processor, cause a computer system to at least:
    maintain, for a user, a remaining item status indicating a remainder of an item in possession by the user;
    maintain, with respect to the item, a first consumption rate determined based on purchases of the item by a broad consumer base, the first consumption rate being periodically updated;
    maintain a second consumption rate determined based on purchases of the item by a group of users into which the user belongs, wherein the group of users comprises fewer users than the broad consumer base, the second consumption rate being periodically updated;
    determine, as a function of the first consumption rate and the second consumption rate, an overall consumption rate;
    update the remaining item status on a periodic basis, the update comprising:
        estimating a portion of the item that has been consumed using the overall consumption rate;
        updating the remaining item status to reflect the portion of the item estimated to have been consumed; and
        updating a remaining item status indicator associated with the updated remaining item status for presentation on a user interface of a device associated with the user;
    detect that the remaining item status has fallen below a threshold level; and
    cause, in response to detecting that the remaining item status has fallen below the threshold level, a replacement item to be offered to the user via the user interface of the device associated with the user;
    receive an authorization from the device associated with the user to ship the item, the authorization provided based at least in part on the updated remaining item status indicator; and
    determine, based at least in part on the received authorization, an instruction to ship the item.

14. The computer readable storage memory device of claim 13, wherein the threshold level is set by the user.

15. The computer readable storage memory device of claim 13, wherein the remaining item status is updated to reflect the replacement item once the replacement item is provided to the user.

16. The computer readable storage memory device of claim 13, wherein the periodic basis is one of a monthly basis, a daily basis, an hourly basis, or a substantially real-time basis.

17. The computer readable storage memory device of claim 13, wherein the replacement item is provided to the user along with at least one other item.

18. The computer-implemented method of claim 1, further comprising selecting a package for shipment of the item based at least in part on the difference between the third renewal date and the first renewal date, wherein the package is one of a plurality of packages, and a rate of usage of packages of the plurality of packages is balanced over time based at least in part on the difference between the first renewal date and the third renewal date.

19. The computer-implemented method of claim 1, wherein a number of shipment packages sent to the user is minimized based at least in part on aggregating the item with other items, the aggregating based at least in part on determining the third renewal date.

* * * * *